United States Patent
Niwata et al.

(10) Patent No.: US 7,974,949 B2
(45) Date of Patent: Jul. 5, 2011

(54) COMPUTER SYSTEM AND AUTOMATIC DATA BACKUP METHOD

(75) Inventors: Syouzou Niwata, Tokyo (JP); Yoshihiro Yano, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1366 days.

(21) Appl. No.: 10/585,622

(22) PCT Filed: Jan. 20, 2005

(86) PCT No.: PCT/JP2005/001046
§ 371 (c)(1), (2), (4) Date: Jul. 11, 2006

(87) PCT Pub. No.: WO2005/071548
PCT Pub. Date: Aug. 4, 2005

(65) Prior Publication Data
US 2009/0193061 A1    Jul. 30, 2009

(30) Foreign Application Priority Data

Jan. 26, 2004  (JP) .................................. 2004-016820

(51) Int. Cl.
*G06F 7/00* (2006.01)
*G06F 17/00* (2006.01)
(52) U.S. Cl. ........................................ 707/640; 707/822
(58) Field of Classification Search .................. 707/640, 707/647, 652, 653, 999.204, 822
See application file for complete search history.

(56) References Cited

U.S. PATENT DOCUMENTS

| | | | | |
|---|---|---|---|---|
| 5,745,669 | A * | 4/1998 | Hugard et al. | 714/3 |
| 6,804,689 | B1 * | 10/2004 | Havrda et al. | 707/661 |
| 6,938,055 | B2 * | 8/2005 | Iida et al. | 707/999.008 |
| 7,653,915 | B1 * | 1/2010 | Walter et al. | 719/328 |
| 2002/0087588 | A1 * | 7/2002 | McBride et al. | 707/204 |
| 2002/0138504 | A1 * | 9/2002 | Yano et al. | 707/204 |

(Continued)

FOREIGN PATENT DOCUMENTS

JP    5-81142    4/1993

(Continued)

OTHER PUBLICATIONS

Honda, M. "Latest storage devices and utilities." *PC User* Magazine (Dec. 4, 2000) vol. 7, No. 1, pp. 201, 5 pages.

(Continued)

*Primary Examiner* — Shahid A Alam
*Assistant Examiner* — Phong Nguyen
(74) *Attorney, Agent, or Firm* — Ladas & Parry LLP (57) ABSTRACT

By limiting a backup object to a particular one, it is possible to reduce the system load and perform effective automatic backup. By using a hard disc device or the like, a first storage unit (40) and a second storage unit (70) are prepared. When the system is started, a spreading and storing unit (30) formed by a device driver spreads an OS program and an application program A on a memory (20). The programs are executed by a program execution unit (10). An application to be backed up is registered in advance in an application registration unit (50). A backup management unit (60) monitors operation of the spreading and storing unit (30). Only when particular data in the memory (20) is stored in the first storage unit (40) according to the storing instruction by the registered application, the backup management unit (60) performs a backup process, i.e., stores the particular data also in the second storage unit (70).

15 Claims, 3 Drawing Sheets

U.S. PATENT DOCUMENTS

2002/0178173 A1* 11/2002 Chefalas et al. ............ 707/200

FOREIGN PATENT DOCUMENTS

| | | |
|---|---|---|
| JP | 2000-82004 | 3/2000 |
| JP | 2000-305830 | 11/2000 |
| JP | 2002-149461 | 5/2002 |

OTHER PUBLICATIONS

Akutsu, Yoshikazu "BHA B's Easy Backup." *Windows Start* Magazine (Dec. 29, 2002) vol. 8, No. 2, pp. 172, 5 pages.

Yamachika, Kei-ichi Ultimate Survival Guide by "Windows Repairing Master" Manual, *Windows 2000 World* Magazine (Jul. 1, 2002) vol. 7, No. 7, pp. 140-141, 5 pages.

* cited by examiner

COMPUTER SYSTEM AND AUTOMATIC DATA BACKUP METHOD

TECHNICAL FIELD

The present invention relates to a computer system and a method of automatically backing up data of the computer system, and particularly relates to an art for automatically backing up specific data prepared by specific application programs.

BACKGROUND ART

With a computer system, it is important to constantly backup data so that even when a hard disk device or other data storage device happens to malfunction, the data can be salvaged. Though data backup can be performed as a manual task by an operator, there is the danger that if an unforeseen accident occurs when the operator has forgotten to perform the backup task, the recovery of data is impossible. Thus since priorly, arrangements, by which data backup is performed automatically by any of various methods without the operator recognizing whatsoever that backup is being performed, have been incorporated in computer systems.

For example, in an operation mode called "level 1" in a disk array system generally referred to as a RAID (Redundant Array of Inexpensive Disks), a disk mirroring process is performed. That is, two hard disk devices of the same capacity are prepared and a process, in which data to be stored are always stored in both of the hard disk devices, is executed. Thus even if a problem occurs with one of the hard disk devices, the recovery of data is enabled by the other hard disk device and the redundancy of data storage can thus be increased.

Methods, in which a normal data storage unit (original file area) and a backup data storage unit (copy file area) are prepared in advance, data are normally stored into the original file area, and the data in the original file area are copied into the copy file area at predetermined timings to increase the redundancy, are also used. For example, Japanese Unexamined Patent Publication No. 2003-263354 discloses a scheduling method for performing automatic backup periodically.

The abovementioned conventional automatic backup methods are intended to increase the redundancy of an entire storage region by copying the entirety of the storage region, which has been designated in advance, as it is. For example, in the disk mirroring mode (level 1) of a RAID system, the contents of one hard disk device are copied exactly as they are into the other hard disk device. In the automatic backup system, in which the contents of the original file area are copied into the copy file area at predetermined timings, the entireties of specific hard disk devices or specific folders are designated as the original file area and the copy file area.

The conventional automatic backup methods are thus premised on designating a hard disk device or a folder as a backup object, and the entire contents of the hard disk device or folder are copied as they are. Data that an operator primarily does not consider necessary to back up thus also become subject to the automatic backup. An unnecessary load is thus placed on the computer system and an efficient backup process cannot be performed.

Recently, due to OS programs and application programs being made highly functional and large in size, various data files are prepared inside a computer system and stored in a hard disk device, etc. Among these various data files, there is quite an amount of files, called "temporary files," that are prepared just for temporary processes. With the conventional automatic backup method, since a backup setting can only be made in file area units that include even such data that do not need to be backed up, an unnecessary load is placed on the computer system and inefficient operation is made inevitable.

An object of the present invention is to provide an automatic data backup method, with which settings are made in a more finely tuned manner to lighten the load of a system and enable an efficient automatic backup process to be performed.

DISCLOSURE OF INVENTION (1) The first feature of the present invention resides in a computer system comprising:

a first storage unit, storing an OS program, an application program, and data;

a memory, for respectively spreading, as necessary, the OS program, an application program, and data stored in the first storage unit;

a program execution unit, performing spread onto the memory and execution of the OS program when provided with an instruction of starting up the system, performing spread onto the memory and execution of a specific application program for which a startup instruction is provided under management of the OS program spread on the memory, and performing, as necessary, a process of preparing new data on the memory or modifying existing data on the memory; and an spreading and storing unit, executing, based on an instruction of a program being executed by the program execution unit, an spreading process of spreading data, stored in the first storage unit, onto the memory and a storing process of storing data spread on the memory into the first storage unit;

the computer system further comprising:

a second storage unit for storing backup data;

an application registration unit, registering one or a plurality of application programs based on an instruction of an operator; and a backup management unit, monitoring operations of the spreading and storing unit and performing, when the spreading and storing unit executes the storing process of storing specific data, spread on the memory, into the first storage unit based on an instruction of an application program registered in the application registration unit, a process of redundantly storing a copy of the specific data into the second storage unit as backup data.

(2) The second feature of the present invention resides in a computer system comprising:

a first storage unit, storing an OS program, an application program, and data;

a memory, for respectively spreading, as necessary, the OS program, an application program, and data stored in the first storage unit;

a program execution unit, performing spread onto the memory and execution of the OS program when provided with an instruction of starting up the system, performing spread onto the memory and execution of a specific application program for which a startup instruction is provided under management of the OS program spread on the memory, and performing, as necessary, a process of preparing new data on the memory or modifying existing data on the memory; and an spreading and storing unit, executing, based on an instruction of a program being executed by the program execution unit, an spreading process of spreading data, stored in the first storage unit, onto the memory and a storing process of storing data spread on the memory into the first storage unit;

the computer system further comprising:

a second storage unit for storing backup data;

an extension registration unit, registering, based on an instruction of an operator, one or a plurality of extensions among file name extensions associated with application programs; and a backup management unit, monitoring operations of the spreading and storing unit and performing, when the spreading and storing unit executes the storing process of storing specific data, with a file name including an extension registered in the extension registration unit, from the memory into the first storage unit, a process of redundantly storing a copy of the specific data into the second storage unit as backup data.

(3) The third feature of the present invention resides in a computer system comprising:

a first storage unit, storing an OS program, an application program, and data;

a memory, for respectively spreading, as necessary, the OS program, an application program, and data stored in the first storage unit;

a program execution unit, performing spread onto the memory and execution of the OS program when provided with an instruction of starting up the system, performing spread onto the memory and execution of a specific application program for which a startup instruction is provided under management of the OS program spread on the memory, and performing, as necessary, a process of preparing new data on the memory or modifying existing data on the memory; and an spreading and storing unit, executing, based on an instruction of a program being executed by the program execution unit, an spreading process of spreading data, stored in the first storage unit, onto the memory and a storing process of storing data spread on the memory into the first storage unit;

the computer system further comprising:

a second storage unit for storing backup data;

an application registration unit, registering one or a plurality of application programs based on an instruction of an operator;

an extension registration unit, registering, based on an instruction of an operator, one or a plurality of extensions among file name extensions associated with application programs; and a backup management unit, monitoring operations of the spreading and storing unit and performing, when the spreading and storing unit executes the storing process of storing specific data, with a file name including an extension registered in the extension registration unit, from the memory into the first storage unit based on an instruction of an application program registered in the application registration unit, a process of redundantly storing a copy of the specific data into the second storage unit as backup data.

(4) The fourth feature of the present invention resides in the computer system according to the first to third features, wherein:

a new file name is generated by changing, based on a predetermined algorithm, an extension portion included in a file name of data stored into the first storage unit and storing the backup data into the second storage unit using the new file name.

(5) The fifth feature of the present invention resides in the computer system according to the first to fourth features, wherein:

the second storage unit is arranged from a plurality of data storage devices, a divided storage processing unit, being connected to the plurality of data storage devices via a network, performing a process of dividing a provided file into a plurality of division files and storing the division files respectively into different data storage devices, and outputting information indicating a method of division and indicating data storage devices that became storage destinations of the respective division files as management information, is furthermore provided, and when a process of storing backup data into the second storage unit is performed, a file of the backup data is provided to the divided storage processing unit.

(6) The sixth feature of the present invention resides in a computer program or a computer-readable recording medium recording the computer program, the computer program comprising:

a first program, making a computer function as the application registration unit or the extension registration unit in the computer system according to the first to fifth features; and a second program, making a computer function as the backup management unit in the computer system according to the first to fifth features.

(7) The seventh feature of the present invention resides in an automatic data backup method for making data be backed up automatically in a computer system having a function of making a desired application program be executed under management of an OS program, the backup method comprising:

an application registration step for making one or a plurality of application, programs, among application programs to be executed, be registered by the computer system based on an instruction of an operator;

an application judgment step for making the computer system judge, when the computer system executes a storing process of storing specific data into a predetermined storage location, whether or not the storing process is based on an instruction of an application program that has been registered in the application registration step; and a backup step for making the computer system redundantly store a copy of the specific data as backup data into a location that differs from the storage location when a positive judgment result is obtained in the application judgment step.

(8) The eighth feature of the present invention resides in an automatic data backup method for making data be backed up automatically in a computer system having a function of making a desired application program be executed under management of an OS program, the backup method comprising:

an extension registration step for making one or a plurality of extensions, among file name extensions associated with application programs to be executed, be registered by the computer system based on an instruction of an operator;

an extension judgment step for making the computer system judge, when the computer system executes a storing process of storing specific data into a predetermined storage location, whether or not the specific data has a file name including an extension that has been registered in the extension registration step; and a backup step for making the computer system redundantly store a copy of the specific data as backup data into a location that differs from the storage location when a positive judgment result is obtained in the extension judgment step.

(9) The ninth feature of the present invention resides in an automatic data backup method for making data be backed up automatically in a computer system having a function of making a desired application program be executed under management of an OS program, the backup method comprising:

an application registration step for making one or a plurality of application programs, among application programs to be executed, be registered by the computer system based on an instruction of an operator;

an extension registration step for making one or a plurality of extensions, among file name extensions associated with application programs to be executed, be registered by the computer system based on an instruction of an operator;

an application judgment step for making the computer system judge, when the computer system executes a storing process of storing specific data into a predetermined storage location, whether or not the storing process is based on an instruction of an application program that has been registered in the application registration step;

an extension judgment step for making the computer system judge, when the computer system executes a storing process of storing specific data into a predetermined storage location, whether or not the specific data has a file name including an extension that has been registered in the extension registration step; and a backup step for making the computer system redundantly store a copy of the specific data as backup data into a location that differs from the storage location when positive judgment results are obtained in both the application judgment step and the extension judgment step.

(10) The tenth feature of the present invention resides in a program for making a computer execute the processes of the respective steps making up the automatic backup method according to the seventh to ninth features, or a computer-readable recording medium recording the program.

According to the present invention, it is possible to select, as object files to be backup, only files which are made by a particular application program, registered in advance, or only files which contain a particular extension, registered in advance, in file names. Therefore, settings are made in a more finely tuned manner to lighten the load of a system and enable an efficient automatic backup process to be performed.

BEST MODE FOR CARRYING OUT THE INVENTION

The present invention shall now be described based on embodiments.

Section 1. Arrangement of a General Computer System

Figure 1:
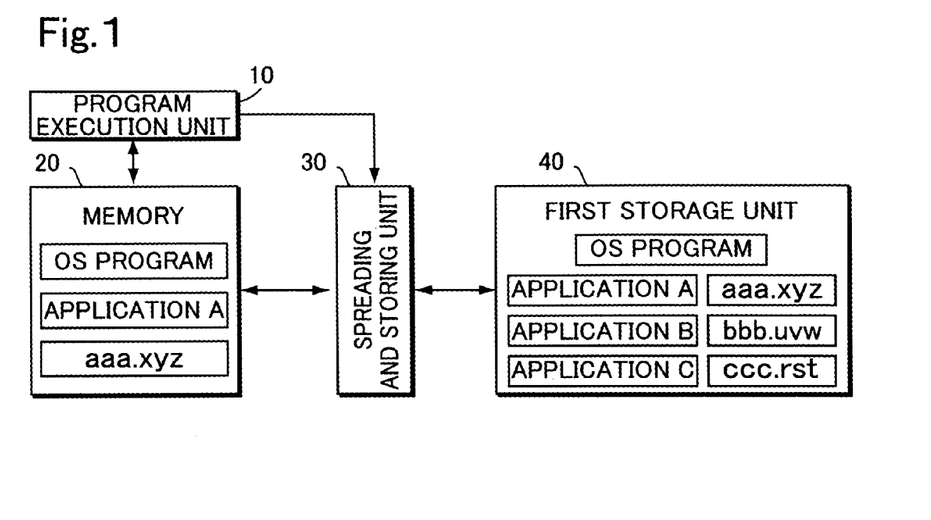
FIG. 1 is a block diagram showing, in the form of blocks, components that handle programs and data in a general computer system.

FIG. 1 is a block diagram showing components, which handle programs and data in a general computer system, in the form of blocks based on the functions of the components. As illustrated, this computer system is arranged from a program execution unit 10, a memory 20, a spreading and storing unit 30, and a first storage unit 40.

The program execution unit 10 is component that serves as a central portion of this computer and is actually arranged from a CPU, a ROM that stores programs for controlling basic functions, etc. The memory 20 is arranged from a RAM in the present example, and in the direct sense, the program execution unit 10 executes programs spread in the memory 20 to perform a predetermined process on data spread in the memory 20. A spreading and storing unit 30 serves functions of spreading programs or data on the memory 20 and storing the programs or data into the first storage unit 40 under the control of the program execution unit 10. The first storage unit 40 is arranged from a hard disk in the present example and serves a function of storing programs and data over a long term. As a matter of course, the first storage unit 40 is not limited to a hard disk device or other magnetic recording device and, for example, an MO disk device or other magneto-optic recording device or a CD-R, DVD-R, DVD-RAM or other optical recording device may be used instead as the first storage unit 40. Meanwhile, the spreading and storing unit 30 is actually arranged from a control circuit and a device driver that control the hard disk device that is the first storage unit 40, and performs the processes of spreading programs or data, stored in the first storage unit 40, on the memory 20 as necessary and storing programs or data on the memory 20 into the first storage unit 40. Here, the first storage unit 40 is provided with the ordinal, "first," since, as shall be described later, a "second" storage unit is prepared for backup in the present invention.

Specific operations of the computer system shown in FIG. 1 shall now be described. As illustrated, with the present example, an OS program, application programs, and data are stored in the first storage unit 40. As mentioned above, the first storage unit 40 is arranged from a hard disk device and the OS program and the application programs are stored in the hard disk device upon being subject to a task of installation into the hard disk device. Since in the direct sense, the program execution unit 10 executes programs that have been spread in the memory 20 and executes various processes on data spread in the memory 20, the OS program, application programs, and data stored in the first storage unit 40 are spread in the memory 20 as necessary.

When an operator turns on the power of this computer system, the program execution unit 10 executes a startup routine inside the ROM and provides, to the spreading and storing unit 30, a startup instruction for the system. Upon receiving the startup instruction, the spreading and storing unit 30 performs a task of spreading the OS program, stored in the first storage unit 40, onto the memory 20. When the spreading of the OS program is completed, the program execution unit 10 starts executing the OS program spread on the memory 20. A state in which the OS of the computer system is started up is thus entered, and the program execution unit 10 executes predetermined process operations based on operation inputs provided from the exterior by an operator and on the OS program spread on the memory 20.

When the operator performs an operation of starting up a specific application under the management of the OS program spread on the memory 20, the program execution unit 10 provides, to the spreading and storing unit 30, an instruction of starting up a specific application program. Upon receiving this startup instruction, the spreading and storing unit 30 performs a task of spreading the specific application program, stored in the first storage unit 40, onto the memory 20. When the spreading of the application program is completed, the program execution unit 10 starts executing the application program, spread on the memory 20, under the management of the OS program likewise spread on the memory 20. A state in which the application program is started up on the computer system is thus entered, and the program execution unit 10 executes the application program while referencing operation inputs provided from the exterior by the operator. Normally by execution of this application program, a process of preparing new data or a process of modifying existing data is performed on the memory 20.

FIG. 1 shows a state wherein the OS program and an application program A are spread and data of a file name, "aaa.xyz," is prepared on the memory 20. This indicates that, under the management of the OS program, the application program A has been started up and the data of the file name, "aaa.xyz," has been prepared by this application program A. If necessary, a plurality of application programs can be started up simultaneously and a plurality of data files can be prepared simultaneously. For example, if in the state shown in FIG. 1, the operator furthermore performs an operation of starting up an application program B, application program B, stored in the first storage unit 40, is spread in the memory 20 by the spreading and storing unit 30, and the program execution unit 10 thereby becomes able to execute both application programs A and B.

The memory 20 is a DRAM (volatile memory) in this embodiment, and though it is suitable for being directly accessed by the program execution unit 10, it is not suitable for long-term storage of data. The data spread in the memory 20 are thus stored in the first storage unit 40 as necessary. An application program generally has a function of providing, to the spreading and storing unit 30, an instruction of storing specific data when the operator performs an operation of inputting an instruction to store the data. As a matter of course, depending on the application program, a process of automatically providing the storage instruction at predetermined timings without an input operation from the operator may be performed. Based on such a storing instruction, the spreading and storing unit 30 executes a process of storing, into the first storage unit 40, the data to be stored that is spread on the memory 20. In the illustrated example, a state where three data files of file names, "aaa.xyz," "bbb.uvw," and "ccc.rst," are stored in the first storage unit 40 is shown.

An application program is generally also equipped with a read instruction for reading out specific data, stored in the first storage unit 40, onto the memory 20 as an object of processing. When the operator performs an operation of inputting such a read instruction, the program execution unit 10 provides, to the spreading and storing unit 30, an instruction to read out the corresponding data. Based on such a read instruction, the spreading and storing unit 30 executes a process of reading out and spreading specific data, stored in the first storage unit 40, onto the memory 20.

Though as mentioned above, the spreading and storing unit 30 is a component arranged from the control circuit and the device driver that control the hard disk device that is the first storage unit 40, it essentially has the function of executing, based on instructions of a program executed by the program execution unit 10, a spreading process of reading out and the spreading data, stored in the first storage unit 40, onto the memory 20 and a storing process of storing data, spread on the memory 20, into the first storage unit 40.

Section 2. First Embodiment According to the Invention

When a conventional general automatic backup system is applied to the computer system shown in FIG. 1, backup is performed in file area units that have been set in advance as mentioned above. For example, if the disk mirroring mode (level 1) of the RAID system is applied, a hard disk device of the same capacity as the hard disk device that makes up the first storage unit is prepared as a second storage unit, and a process of storing the same data in both the first storage unit and the second storage unit is performed. In the case of the automatic backup system that sets the first storage unit as the original file area and the second storage unit as the copy file area and copies the contents of the original file area at the predetermined timings into the copy file area, all of the data in the first storage unit are backed up into the second storage unit. Thus with the conventional automatic backup methods, useless copying of data that do not need to be backed up is performed and an inefficient backup process that places an unnecessary load on the computer system is performed inevitably.

An object of the present invention is to make settings in a more finely tuned manner to lighten the load of a system and perform an efficient automatic backup process. With a first embodiment according to the present invention shown in FIG. 2, finely tuned setting is realized by designation of application programs that are to be subject to backup.

Figure 2:
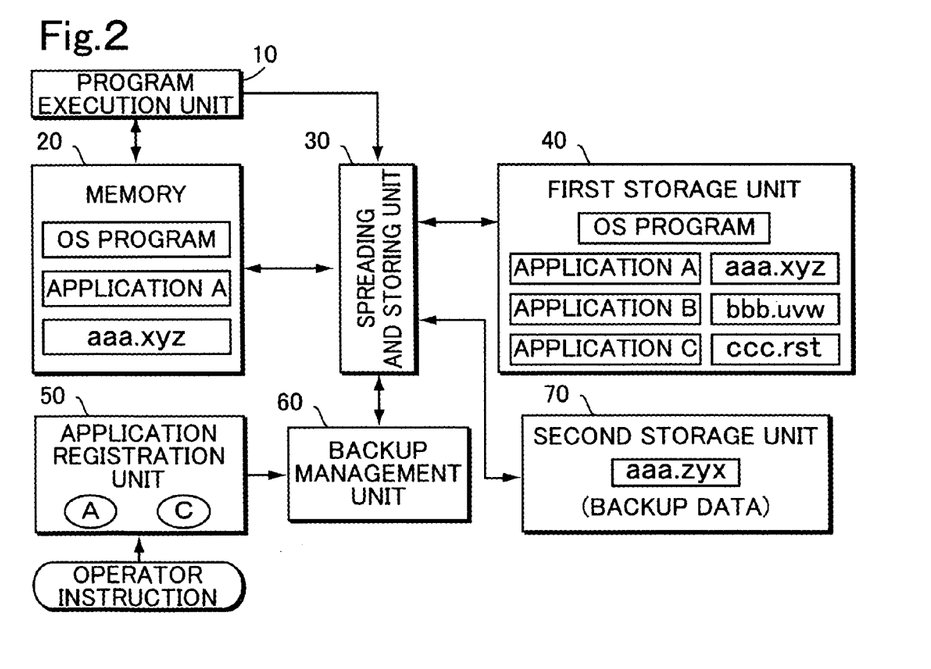
FIG. 2 is a block diagram of a basic arrangement of a computer system according to a first embodiment of the present invention.

With the computer system shown in FIG. 2, an application registration unit 50, a backup management unit 60, and a second storage unit 70 are added to the basic computer system shown in FIG. 1. The second storage unit 70 is a storage device for storing backup data, and as with the first storage unit 40, may be arranged using a hard disk device or other magnetic recording device, an MO disk device or other magneto-optic recording device, or a CD-R, DVD-R, DVD-RAM or other optical recording device. As a matter of course, the devices making up the respective storage units do not necessarily have to be the same type of device and the storage capacities do not have to be the same either. That is for example, the first storage unit 40 may be arranged from a hard disk device and the second storage unit 70 may be arranged from a DVD-RAM device. Also, though in FIG. 2, the first storage unit 40 and the second storage unit 70 are indicated as separate blocks for the sake of convenience, a single storage unit may be shared by the first storage unit 40 and second storage unit 70, with a portion of the recording area being used as the first storage unit 40 and another portion of the recording area being used as second storage unit 70.

The application registration unit 50 is a component having a function of registering one or a plurality of application programs based on an instruction of the operator. In the illustrated example, a state wherein application programs A and C are registered is shown. Though the information to be actually registered in the application registration unit 50 may be any information by which an application program can be specified, in general, information indicating a file name of an application program is registered.

Meanwhile, the backup management unit 60 monitors the operations of the spreading and storing unit 30, and when the spreading and storing unit 30 executes the storing process of storing specific data, spread on the memory 20, into the first storage unit 40 based on an instruction of an application program registered in the application registration unit 50, the backup management unit 60 performs a process of redundantly storing a copy of the specific data, which is the object of storing, into the second storage unit 70 as backup data.

FIG. 2 shows a state where, when the program execution unit 10 is executing application program A, spread on the memory 20, the process of storing the file, "aaa.xyz," is executed by the application program A. The file, "aaa.xyz," which is spread on the memory 20, is data that has been prepared by the application program A. In executing the process of storing the file, "aaa.xyz," based on the application program A, the program execution unit 10 provides a storage instruction to the spreading and storing unit 30. As mentioned above, the actual entity of the spreading and storing unit 30 is the device driver of a hard disk device or other storage device, and upon receiving such a storage instruction, the spreading and storing unit 30 executes the process of storing the file, "aaa.xyz," on the memory 20, into the first storage unit 40. The backup management unit 60 monitors such operations of the spreading and storing unit 30 and, when the spreading and storing unit 30 executes the storing process, judges whether the storing process is based on an instruction of an application program registered in the application registration unit 50.

In the illustrated example, the process of storing the file, "aaa.xyz," is based on an instruction of application program A, and the application program A is registered in the application registration unit 50. The backup management unit 60 thus recognizes the file, "aaa.xyz," to be data to be backed up and issues an instruction to perform the backup process to the spreading and storing unit 30. The spreading and storing unit 30 thus performs the process of storing the file, "aaa.xyz," on the memory 20, into the first storage unit 40 and the process of redundantly storing a copy of the file into the second storage unit 70 as backup data.

With the illustrated example, since application programs A and C are registered in the application registration unit 50, when the spreading and storing unit 30 performs the process of storing data into the first storage unit 40 based on an instruction from application program A or C, it always stores a copy of the data into the second storage unit 70 as well. However, in performing the process of storing data into the first storage unit 40 based on an instruction from the unregistered application program B, backup into the second storage unit 70 is not performed. Data that are prepared temporarily on the memory 20 and stored into the first storage unit 40 based on an instruction from the OS program, etc., are also not subject to backup.

The data that are the objects of automatic backup in this computer system are thus limited to data that are objects of the storing process by the application programs registered in the application registration unit 50 in advance by the operator. The need to perform backup in units of file areas that include unnecessary data as in the conventional backup system is thus eliminated and an efficient automatic backup process, with which the load on the system is lightened, can be realized.

The computer system shown in FIG. 2 is a computer system having the function of making a desired application program be executed under the management of the OS program, and to make data be backed up automatically in such a system, processes of the following steps are performed.

First, a process of an application registration step for making one or a plurality of application programs, among the application programs to be executed by the computer system, be registered based on an instruction of the operator is performed. FIG. 2 shows an example where application programs A and C are registered in the application registration unit 50. As a matter of course, the contents registered in the application registration unit 50 can be changed at any time. Though the operator must perform the task for this registration with awareness, once the registration task is completed, the operator does not have to be aware of subsequent backup processes since these are carried out automatically.

Here, when the program execution unit 10 executes the storing process of storing specific data on the memory 20 into the first storage unit 40 based on the OS or a predetermined application program, the instruction for this is provided to the spreading and storing unit 30. Based on this storage instruction, the spreading and storing unit 30 executes the process of storing the specific data into the first storage unit 40. At this point, an application judgment step is executed in which the backup management unit 60 judges whether or not the storing process is based on an instruction of an application program that has been registered in the application registration step.

If a positive result is obtained in this application judgment step, the backup management unit 60 provides a backup instruction to the spreading and storing unit 30. A backup step is thereby executed in which a copy of the specific data is redundantly stored as backup data into the second storage unit 70 that differs from the first storage unit 40.

Since the data subject to backup is thus stored in both the first storage unit 40 and the second storage unit 70, even if a problem occurs in the first storage unit 40 and the stored data becomes unable to be read, the data can be restored using the backup data stored in the second storage unit 70. With the embodiment illustrated here, since a special arrangement for restoring the data is not provided, a file management function of the OS program is used to read backup data in the second storage unit 70. Obviously, a specialized function for restoring data may be provided if necessary.

As mentioned above, the actual entity of the spreading and storing unit 30 is a device driver, and when the spreading and storing unit 30 executes the process of storing specific data in the first storage unit 40, a file renewal history log is prepared. Thus if this file renewal history log is arranged to be collected and stored in some storage location, this file renewal history log can be referenced to specify the data file to be subject to restoration that is stored in the second storage unit 70 in the process of restoring data from the second storage unit 70 when a problem happens to occur.

Though the original data stored in the first storage unit 40 and the backup data stored in the second storage unit 70 may have the same file names, with the embodiment illustrated here, a new file name is generated by changing, based on a predetermined algorithm, the extension portion included in the file name of the data stored in the first storage unit 40, and the backup data is stored in the second storage unit 70 under this new file name.

For example, FIG. 2 shows an example where data of the file name, "aaa.xyz," on the memory 20 is to be stored. Here, of the file name, "aaa.xyz," the "aaa" portion is the main portion of the file name and the "xyz" portion that follows the "." is the extension portion. MS-DOS and many other OS programs carry out operations using file names that include such extensions. Thus with the embodiment shown in FIG. 2, the backup data is stored upon being provided with a new file name, with which the extension portion is changed. Specifically in the example of FIG. 2, the extension portion is changed based on an algorithm of "inverting the order of the character string making up the extension." Thus the data of the file name, "aaa.xyz," on the memory 20 is stored with the same file name as it is into the first storage unit 40 but is stored as backup data into the second storage unit 70 upon being provided with a new file name of "aaa.zyx."

The following two merits are provided when the original data stored in the first storage unit 40 and the backup data stored in the second storage unit 70 are handled in a manner wherein the main portion of the file name is kept the same and just the extension portion is changed.

A first merit is that the two data can be distinguished clearly by the difference in the extension. Though the original data file, "aaa.xyz," and the backup data file, "aaa.zyx," are exactly the same data, since these are separate and independent data files in terms of the system, if the file names are the same, they cannot be distinguished from each other, and in some cases correct handling in terms of the system cannot be performed. By changing the extension portion, the files can be handled as completely different files in terms of the system and the operator can also recognize these as different files.

A second merit is that since the main portion of the file name is kept the same, an information portion of the file name that is of meaning to a general user is not changed. In general, a character string with some meaning is normally used in the main portion of the file name. For example, if a character string, such as "August Sales" is used as the main portion of the file name, the actual file name will have the extension, "xyz," added and will thus be "August Sales.xyz." In this case, the original data stored in the first storage unit 40 is stored under the file name, "August Sales.xyz," as it is, while the backup data stored in the second storage unit 70 is stored under the new file name, "August Sales.zyx." However, the two file names differ only in the extension portion and are the same in the "August Sales" portion that is the portion with meaning so that a function of recognizing the data contents from the file name is not compromised.

Obviously, the algorithm for changing the extension is not limited to the algorithm of "inverting the order of the character string making up the extension," and any of various other algorithms may be used. For example, if an algorithm of "repeating the character string making up the extension twice" is used, the backup data file name for the original data file name of "aaa.xyz" will be "aaa.xyzxyz." Since, in terms of the OS program, the extension that is attached to the file name often serves a role of indicating an association with an application program that can open the data, if data restored from the second storage unit 70 is to be actually used by any chance, a task of restoring the extension to its original form based on an algorithm that is inverse the above-described algorithm will be necessary.

Section 3. Second Embodiment According to the Invention

A second embodiment according to the present invention shall now be described with reference to the block diagram of FIG. 3. With the above-described computer system according to the first embodiment, finely tuned settings are realized by designation of application programs to be subject to backup. Meanwhile, with a computer system according to the second embodiment to be described here, a method of designating data to be subject to backup by the extension included in the file name is employed. The two embodiments differ just in this point and are the same in the other basic portions. The second embodiment shall thus be described while noting this point of difference.

Figure 3:
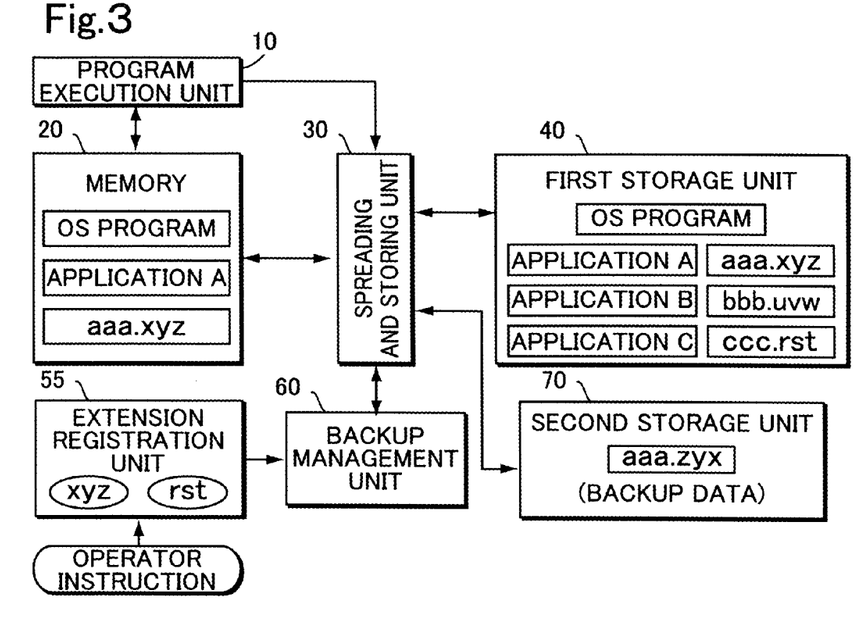
FIG. 3 is a block diagram of a basic arrangement of a computer system according to a second embodiment of the present invention.

The only difference between the block diagram shown in FIG. 2 and the block diagram shown in FIG. 3 is that the application registration unit 50 in the former is replaced by an extension registration unit 55. Whereas the application registration unit 50 is a component with the function of registering specific application programs, the extension registration unit 55 is a component with a function of registering extensions. That is, the extension registration unit 55 serves a function of registering, based on an instruction of the operator, one or a plurality of extensions among file name extensions associated with application programs. With the illustrated example, a state where an extension, "xyz," and an extension, "rst," are registered in the extension registration unit 55 is illustrated.

Though for the sake of convenience, the backup management unit 60 is indicated by the same block in FIGS. 2 and 3, the function of this unit differs between the two embodiments. That is, the backup management unit 60 shown in FIG. 3 monitors the operations of the spreading and storing unit 30, and when the spreading and storing unit 30 executes a storing process of storing specific data, with a file name that includes an extension that is registered in the extension registration unit 55, from the memory 20 into the first storage unit 40, the backup management unit 60 performs a process of making a copy of the specific data be stored as backup data into the second storage unit 70. That is, whereas the backup management unit 60 shown in FIG. 2 has the function of monitoring whether or not a storing process is performed based on the instruction of a registered application program, the backup management unit 60 shown in FIG. 3 differs in having the function of monitoring whether or not a process of storing data, having a file name that includes a registered extension, is being performed. In both cases, when a positive judgment is made, the backup process is performed on the second storage unit 70 in the same manner.

Thus with the computer system shown in FIG. 3, processes of the following steps are performed to make data be backed up automatically.

First, a process of an extension registration step for making one or a plurality of extensions, among the file name extensions associated with the application programs to be executed, be registered based on an instruction of the operator is performed. In the example of FIG. 3, the extension, "xyz," and the extension, "rst," are registered in the extension registration unit 55. As a matter of course, the contents registered in the extension registration unit 55 can be changed at any time. Though the operator must perform the task for this registration with awareness, once the registration task is completed, the operator does not have to be aware of subsequent backup processes since these are carried out automatically.

Here, when the spreading and storing unit 30 executes the process of storing the specific data into the first storage unit 40, an extension judgment step is carried out in which the backup management unit 60 judges whether or not the specific data is data having a file name that includes an extension that has been registered in the extension registration step. For example, if the process of storing into the first storage unit 40 is performed on data with the file name, "aaa.xyz," on the memory 20, a positive judgment is made in the extension judgment step.

If a positive result is thus obtained in the extension judgment step, the backup management unit 60 provides the backup instruction to the spreading and storing unit 30. The backup step is thereby executed in which a copy of the specific data is redundantly stored as backup data in the second storage unit 70 that differs from the first storage unit 40. In the above-described example, the backup process is executed on data with the file name, "aaa.xyz," and storage into the second storage unit 70 using the new file name "aaa.zyx" (file name obtained by reversing the order of the character string making up the extension) is thus executed. Though the backup process is likewise executed on data with a file name that includes the extension, "rst," the backup process is not executed on data with a file name that includes the extension, "uvw."

Thus with the computer system according to the second embodiment, the data to be subject to automatic backup are limited to just the data with file names including specific extensions that have been registered in advance in the extension registration unit 55 by the operator. Thus the need to perform backup in units of file areas that include unnecessary data as in the conventional backup system is eliminated and an efficient automatic backup process, with which the load on the system is lightened, can be realized.

Though normally, an extension for a file name is defined in association with a specific application program, the relationships between extensions and application programs are not necessarily limited to one-to-one correspondences. For example, the extension, "txt," is an extension that indicates text data and is generally attached to a file name of data that can be opened by an application program called a text editor. The extension, "html," is an extension that mainly indicates Web page data and is generally attached to a file name of data that can be opened by an application program called a Web browser. Though various extensions besides these, such as an extension indicating image data written under a specific format, an extension indicating audio data written under a specific format, etc., are used, all such extensions are used as information indicating the type or format of the data.

With the second embodiment, since by registering predetermined extensions in advance, backup is performed automatically on data with file names that include these extensions, the operator is enabled to set whether or not to perform backup according to the type or format of the data. This is extremely useful for performing efficient automatic backup based on finely tuned settings. For example, an operator who mainly handles photographic images may desire a form of operation where, as long as just data of photographic images can be backed up, the backup of other data is completely unnecessary. In such a case, the desired, efficient form of operation is enabled, for example, by registering just "jpeg" and other extensions for photographic images in the extension registration unit 55.

Section 4. Third Embodiment According to the Invention

A third embodiment according to the present invention shall now be described with reference to the block diagram of FIG. 4. This third embodiment can be referred to as a combination of the above-described first and second embodiments and employs a method of designating data to be subject to backup by both the application program providing the storing instruction and the extension included in the file name.

Figure 4:
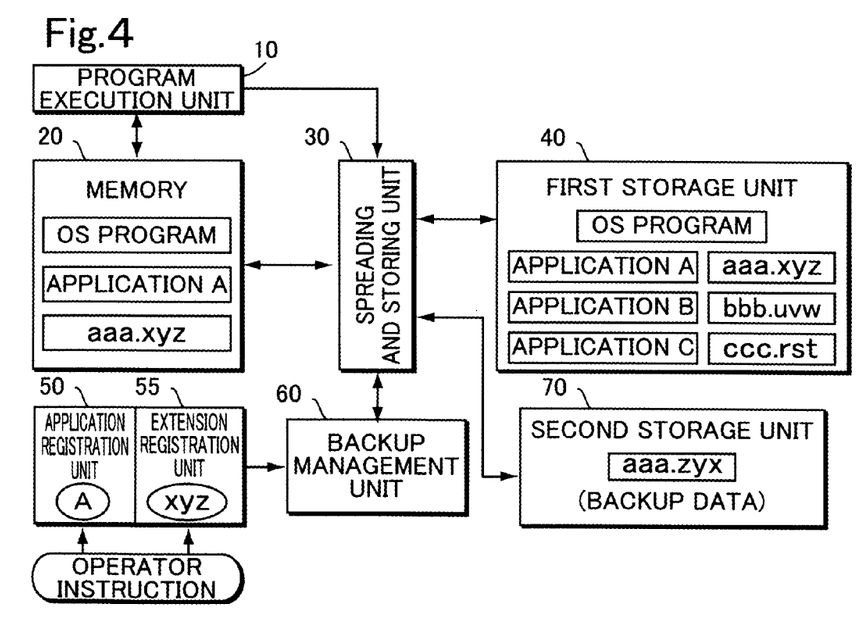
FIG. 4 is a block diagram of a basic arrangement of a computer system according to a third embodiment of the present invention.

As shown in the block diagram of FIG. 4, a computer system according to this third embodiment is provided with both the application registration unit 50 and the extension registration unit 55. The application registration unit 50 is a component with the same function as the application registration unit 50 shown in FIG. 2 and has the function of registering one or a plurality of applications based on an instruction of the operator. Meanwhile, the extension registration unit 55 is a component with the same function as the extension registration unit 55 shown in FIG. 3 and has the function of registering, based on an instruction of the operator, one or a plurality of extensions among file name extensions associated with application programs. With the illustrated example, a state where the application program A is registered in the application registration unit 50 and the extension, "xyz," is registered in the extension registration unit 55 is illustrated.

Meanwhile, the backup management unit 60 shown in FIG. 4 monitors the operations of the spreading and storing unit 30, and when the spreading and storing unit 30 executes the storing process of storing specific data, with a file name that includes an extension registered in the extension registration unit 55, from the memory 20 into the first storage unit 40 based on an instruction of an application program registered in the application registration unit 50, the backup management unit 60 performs a process of redundantly storing a copy of the specific data into the second storage unit 70 as backup data.

To make data be backed up automatically in the computer system shown in FIG. 4, processes of the following steps are performed.

First, processes of an application registration step, of making one or a plurality of application programs, among the application programs to be executed by the computer system, be registered, and an extension registration step, of making one or a plurality of extensions, among the file name extensions associated with the application programs to be executed, be registered, are performed based on instructions of the operator. FIG. 4 shows an example where the application program A is registered in the application registration unit 50 and the extension, "xyz," is registered in the extension registration unit 55. As a matter of course, these registered contents can be changed at any time. Though the operator must perform the task for this registration with awareness, once the registration task is completed, the operator does not have to be aware of subsequent backup processes since these are carried out automatically.

Here, if the spreading and storing unit 30 executes the process of storing specific data into the first storage unit 40 based on an instruction of a specific application program, the backup management unit 60 executes an application judgment step, of judging whether or not the specific application program is an application program that has been registered in the application registration step, and an extension judgment step, of judging whether the specific data is data with a file name that includes an extension that has been registered in the extension registration step. For example, if the process of storing into the first storage unit 40 is executed on data with the file name, "aaa.xyz," on the memory 20 by an instruction of the application program A, positive judgments are made in both of these judgment steps.

If positive judgment results are obtained in both the application judgment step and the extension judgment step, the backup management unit 60 provides a backup instruction to the spreading and storing unit 30. A backup step is thereby executed in which a copy of the specific data is redundantly stored as backup data in the second storage unit 70 that differs from the first storage unit 40. With the above example, the backup process is executed on the data with the file name, "aaa.xyz," and storing into the second storage unit 70 is thus executed with a new file name, "aaa.zyx" (in this example, a new file name with which the order of the character string making up the extension is reversed).

Thus with the computer system according to the third embodiment, the data subject to automatic backup are limited just to data, among the data subject to storage according to an instruction of a specific application program registered in the application registration unit 50 by the operator in advance, that have file names that include specific extensions registered in the extension registration unit 55. Thus the need to perform backup in units of file areas that include unnecessary data as in the conventional backup system is eliminated and an efficient automatic backup process, with which the load on the system is lightened, can be realized.

As mentioned above, the relationships between extensions and application programs are not necessarily limited to one-to-one correspondences. Actually, there are quite a few application programs that have a function of storing data in a plurality of formats. With such an application program, data storage is performed under an arbitrary format selected by the operator. Normally in this case, an extension corresponding to the selected format is automatically attached to the file name of the data to be stored. The third embodiment is thus extremely useful in a case where, among data prepared by specific application programs, just the data stored under specific formats are to be subject to backup.

For example, suppose an operator, who performs tasks of processing photographic images using the specific application program A for performing photo retouch tasks, decides to store data under a first format (for example, of extension, "uvw") up to an intermediate stage of processing and store data at the completion of processing under a second format (for example, of extension, "xyz") and wishes to backup the data at the completion of processing but does not require backup of the data at the intermediate stage. In this case, by registering the application program A in the application registration unit 50 and registering the extension, "xyz," in the extension registration unit 55 as in the example shown in FIG. 4, the automatic backup process is executed under the desired settings.

Section 5. Modification Example According to the Invention

Figure 5:
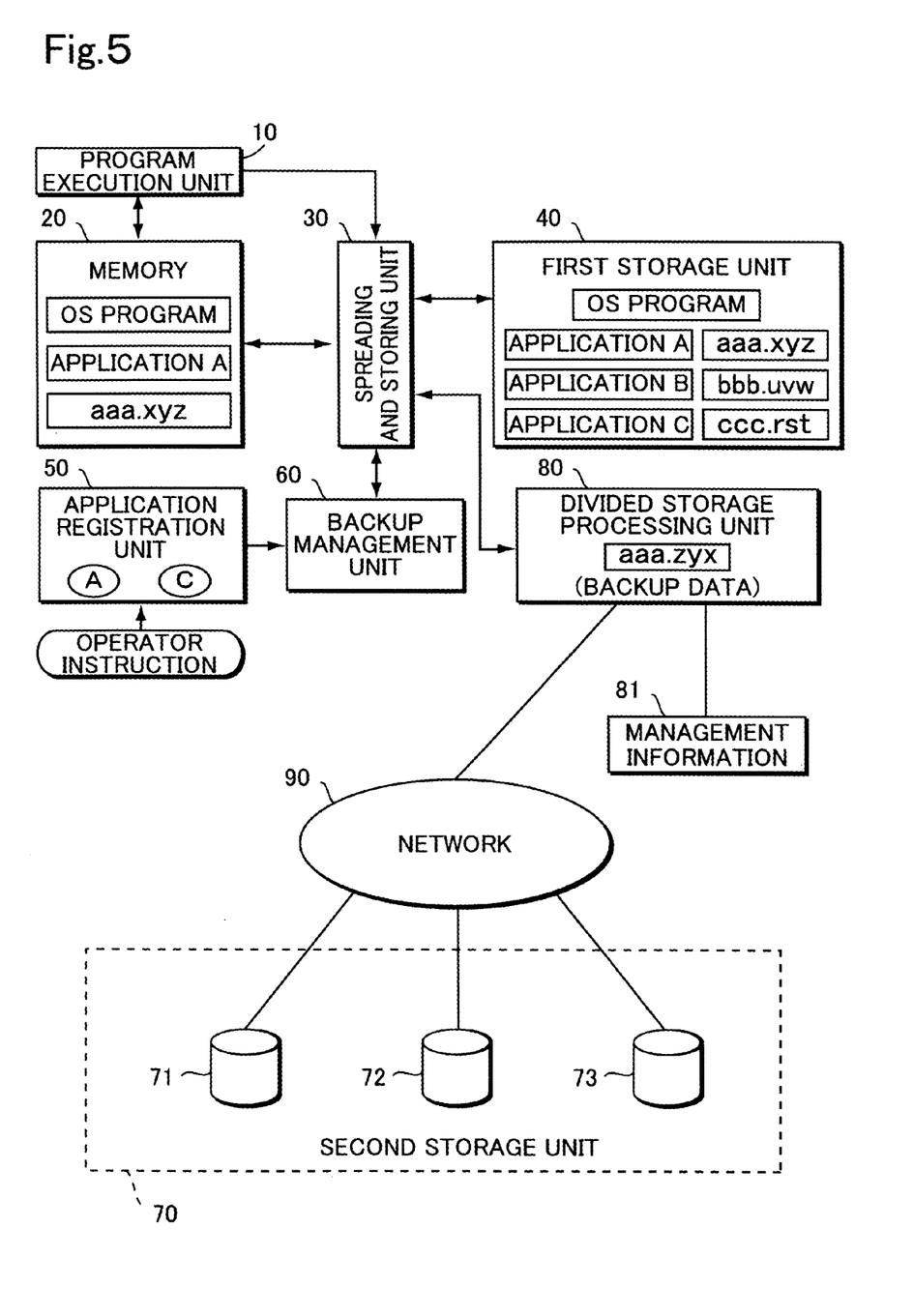
FIG. 5 is a block diagram of a basic arrangement of a computer system according to a modification example of the present invention.

The present invention has been described above with three embodiments, and here, a modification example, in which second storage unit 70 is arranged from a data storage device connected to a network, shall be described.

FIG. 5 shows a modification example of the first embodiment shown in FIG. 2. The differences with respect to the embodiment of FIG. 2 are that a divided storage processing unit 80 is provided anew and backup data are arranged to be stored from the divided storage processing unit 80 into the second storage unit 70 via a network 90. In the illustrated example, the second storage unit 70 is arranged from three data storage devices 71, 72, and 73 that are respectively positioned in a dispersed manner. Each of the three data storage devices 71, 72, and 73 is arranged from a data server device connected to the network 90.

The divided storage processing unit 80 is connected via the network 90 to the three data storage devices 71, 72, and 73. The divided storage processing unit 80 performs a process of dividing a backup file, provided from the spreading and storing unit 30, into a plurality of division files based on a division method according to a predetermined algorithm and storing the respective division files obtained into different data storage devices. This unit also has a function of outputting information, indicating the method of the division process, and information, indicating the data storage devices that became the storage destinations of the respective division files, as management information 81.

For example, suppose that backup data of the file name, "aaa.zyx," is provided from the spreading and storing unit 30 to the second storage unit 70 as data to be stored. The processes up to the output of such backup data from the spreading and storing unit 80 are exactly the same as the operations of the computer system shown in FIG. 2. Upon receiving the backup data called "aaa.zyx," the divided storage processing unit 80 performs the process of dividing this data into a plurality of division files. Here, suppose that the received data file is divided into the three division files of "aaa1.zyx," "aaa2.zyx," and "aaa3.zyx." The division method may be of any algorithm. For example, a division method of splitting the entire data string into a head portion, an intermediate portion, and a tail portion may be employed, or a division method may be employed in which a first division file is arranged from the 1st byte, 4th byte, 7th byte, etc., a second division file is arranged from the 2nd byte, 5th byte, 8th byte, etc., and a third division file is arranged from the 3rd byte, 6th byte, 9th byte, etc. Also if necessary, encryption may be applied along with the division.

When the three division files "aaa1.zyx," "aaa2.zyx," and "aaa3.zyx," have thus been obtained, the divided storage processing unit 80 performs the process of storing the division files into the data storage devices 71, 72, and 73, respectively, via the network 90. The information indicating the division method used to prepare the division files and the information indicating where the division files are stored (for example, the URL addresses of the data servers making up data storage devices 71, 72, and 73, etc.) are output as management information 81. The management information 81 may also be stored and saved in an IC card or other recording medium.

Even with this modification example, when the original data stored in the first storage unit 40 is lost by accident, the data can be restored using the backup data stored in the second storage unit 70. However, in this case, management information 81 is necessary. Though the illustrated example is a simple example in which the second storage unit 70 is arranged from the data storage devices 71, 72, and 73, if for practical use, the internet is used as the network 90, numerous data servers installed at arbitrary locations around the world can be used as the data storage devices. In that case, unless information, indicating in which data servers the three division files, "aaa1.zyx," "aaa2.zyx," and "aaa3.zyx," are stored, is provided, these division files practically cannot be gathered. Also, even if it is possible to gather these three division files, unless information, indicating the division method used to perform division of the original file to obtain the three division files (this information is also stored in the management information 81), is not provided, the three division files cannot be synthesized to restore the original backup data file.

Though this modification example thus requires management information 81 for the process of restoring the backup data and has a demerit that the restoration process procedure is somewhat complicated, a merit that the security of the backup data can be improved is provided. That is, because by using the internet as the network 90, the data servers making up the second storage unit 70 can be positioned dispersedly at various locations around the world, even if the first storage unit 40 becomes damaged due to an earthquake or other disaster, the possibility that even the backup data stored in the second storage unit 70 will be damaged at the same time is extremely low. Moreover, because the management information 81 is essential for data restoration as described above, even if the data servers making up second storage unit 70 are accessed by an illicit method, the possibility that the original backup data will be restored is extremely low.

The present invention has been described above based on the embodiments and with reference to the block diagrams of FIGS. 2 to 5. Though in these block diagrams, the components, such as the application registration unit 50, the extension registration unit 55, and the backup management unit 60, are respectively indicated as independent blocks for the sake of description, these components are actually to be realized by hardware portions or software that make up the computer system. For example, the actual entity of the application registration unit 50 is a combination of software and hardware that has the function of receiving, from the operator, an instruction specifying the application program to be subject to registration and recording the instruction. Thus in actuality, the application registration unit 50 is arranged from a predetermined program executed by the program execution unit 10 and a recording device (memory, hard disk, etc.) that records the registered information. The same applies to the extension registration unit 55. The backup management unit 60 is also arranged from a program incorporated so as to cooperate with the device driver that makes up the spreading and storing unit 30.

Each of the computer systems shown in FIGS. 2 to 4 can thus be realized by adding, to the general computer system shown in FIG. 1, a data recording device that functions as the second storage unit 70 (or a portion of an existing hard disk device, etc. can be allocated as the second storage unit 70) and installing a dedicated automatic backup program that functions as the application registration unit 50, the extension registration unit 55, and backup management unit 60. This dedicated automatic backup program can be distributed upon recording in a CD-ROM or other computer-readable recording medium and can also be distributed online.

INDUSTRIAL APPLICABILITY

The present invention can be applied widely to computer systems for making various application programs operate and is particularly optimal for an application of automatically backing up data prepared by the respective application programs.

The invention claimed is:

1. A computer system comprising:
a first storage unit (40), storing an OS program, an application program, and data;
a memory (20), for respectively spreading, as necessary, the OS program, an application program, and data stored in the first storage unit;
a program execution unit (10), performing spread onto the memory and execution of the OS program when provided with an instruction of starting up the system, performing spread onto the memory and execution of a specific application program for which a startup instruction is provided under management of the OS program spread on the memory, and performing, as necessary, a process of preparing new data on the memory or modifying existing data on the memory; and
a spreading and storing unit (30), executing, based on an instruction of a program being executed by the program execution unit, a spreading process of spreading data, stored in the first storage unit, onto the memory and a storing process of storing data spread on the memory into the first storage unit;
the computer system further comprising:
a second storage unit (70) for storing backup data;
an application registration unit (50), registering one or a plurality of application programs based on an instruction of an operator; and
a backup management unit (60), monitoring operations of the spreading and storing unit and performing, when the spreading and storing unit executes the storing process of storing specific data, spread on the memory, into the first storage unit, a first process of judging whether or not the storing process is based on an instruction of an application program that has been registered in the application registration unit and a second process of redundantly storing a copy of the specific data into the second storage unit as backup data, said second process being performed only when a positive result is obtained in said first process,
wherein
the second storage unit (70) is arranged from a plurality of data storage devices (71, 72, and 73), and
a divided storage processing unit (80), being connected to the plurality of data storage devices via a network, performing a process of dividing a provided file into a plurality of division files and storing the division files respectively into different data storage devices, and outputting information indicating a method of division and indicating data storage devices that became storage destinations of the respective division files as management information, is furthermore provided.

2. The computer system according to claim 1, wherein:
a new file name is generated by changing, based on a predetermined algorithm, an extension portion included in a file name of data stored into the first storage unit (40) and storing the backup data into the second storage unit (70) using the new file name.

3. The computer system according to claim 1, wherein:
when a process of storing backup data into the second storage unit is performed, a file of the backup data is provided to the divided storage processing unit.

4. The computer system according to claim 2, wherein:
when a process of storing backup data into the second storage unit is performed, a file of the backup data is provided to the divided storage processing unit.

5. A computer system comprising:
a first storage unit (40), storing an OS program, an application program, and data;
a memory (20), for respectively spreading, as necessary, the OS program, an application program, and data stored in the first storage unit;
a program execution unit (10), performing spread onto the memory and execution of the OS program when provided with an instruction of starting up the system, performing spread onto the memory and execution of a specific application program for which a startup instruction is provided under management of the OS program spread on the memory, and performing, as necessary, a process of preparing new data on the memory or modifying existing data on the memory; and
a spreading and storing unit (30), executing, based on an instruction of a program being executed by the program execution unit, a spreading process of spreading data, stored in the first storage unit, onto the memory and a storing process of storing data spread on the memory into the first storage unit;
the computer system further comprising:
a second storage unit (70) for storing backup data;
an extension registration unit (55), registering, based on an instruction of an operator, one or a plurality of extensions among file name extensions associated with application programs; and
a backup management unit (60), monitoring operations of the spreading and storing unit and performing, when the spreading and storing unit executes the storing process of storing specific data, spread on the memory, into the first storage unit, a first process of judging whether or not the specific data has a file name including an extension registered in the extension registration unit and a second process of redundantly storing a copy of the specific data into the second storage unit as backup data, said second process being performed only when a positive result is obtained in said first process,
wherein
the second storage unit (70) is arranged from a plurality of data storage devices (71, 72, and 73), and
a divided storage processing unit (80), being connected to the plurality of data storage devices via a network, performing a process of dividing a provided file into a plurality of division files and storing the division files respectively into different data storage devices, and outputting information indicating a method of division and indicating data storage devices that became storage destinations of the respective division files as management information, is furthermore provided.

6. The computer system according to claim 5, wherein:
a new file name is generated by changing, based on a predetermined algorithm, an extension portion included in a file name of data stored into the first storage unit (40) and storing the backup data into the second storage unit (70) using the new file name.

7. The computer system according to claim 5, wherein:
when a process of storing backup data into the second storage unit is performed, a file of the backup data is provided to the divided storage processing unit.

8. The computer system according to claim 6, wherein:
when a process of storing backup data into the second storage unit is performed, a file of the backup data is provided to the divided storage processing unit.

9. A computer system comprising:
a first storage unit (40), storing an OS program, an application program, and data;
a memory (20), for respectively spreading, as necessary, the OS program, an application program, and data stored in the first storage unit;
a program execution unit (10), performing spread onto the memory and execution of the OS program when provided with an instruction of starting up the system, performing spread onto the memory and execution of a specific application program for which a startup instruction is provided under management of the OS program spread on the memory, and performing, as necessary, a process of preparing new data on the memory or modifying existing data on the memory; and
a spreading and storing unit (30), executing, based on an instruction of a program being executed by the program execution unit, a spreading process of spreading data, stored in the first storage unit, onto the memory and a storing process of storing data spread on the memory into the first storage unit;
the computer system further comprising:
a second storage unit (70) for storing backup data;
an application registration unit (50), registering one or a plurality of application programs based on an instruction of an operator;
an extension registration unit (55), registering, based on an instruction of an operator, one or a plurality of extensions among file name extensions associated with application programs; and
a backup management unit (60), monitoring operations of the spreading and storing unit and performing, when the spreading and storing unit executes the storing process of storing specific data, spread on the memory, into the first storage unit, a first process of judging whether or not the storing process is based on an instruction of an application program that has been registered in the application registration unit, a second process of judging whether or not the specific data that has a file name, including an extension registered in the extension registration unit, and a third process of redundantly storing a copy of the specific data into the second storage unit as backup data, said third process being performed only when a positive result is obtained in both of said first process and said second process,
wherein
the second storage unit (70) is arranged from a plurality of data storage devices (71, 72, and 73), and
a divided storage processing unit (80), being connected to the plurality of data storage devices via a network, performing a process of dividing a provided file into a plurality of division files and storing the division files respectively into different data storage devices, and outputting information indicating a method of division and indicating data storage devices that became storage destinations of the respective division files as management information, is furthermore provided.

10. The computer system according to claim 9, wherein:
a new file name is generated by changing, based on a predetermined algorithm, an extension portion included in a file name of data stored into the first storage unit (40) and storing the backup data into the second storage (70) using the new file name.

11. The computer system according to claim 9, wherein:
when a process of storing backup data into the second storage unit is performed, a file of the backup data is provided to the divided storage processing unit.

12. The computer system according to claim 10, wherein:
when a process of storing backup data into the second storage unit is performed, a file of the backup data is provided to the divided storage processing unit.

13. An automatic data backup method for making data be backed up automatically in a computer system having a function of making a desired application program be executed under management of an OS program, the backup method comprising:
an application registration step for making one or a plurality of application programs, among application programs to be executed, be registered by the computer system based on an instruction of an operator;
an application judgment step for making the computer system judge, when the computer system executes a storing process of storing specific data into a predetermined storage location, whether or not the storing process is based on an instruction of an application program that has been registered in the application registration step; and
a backup step for making the computer system redundantly store a copy of the specific data as backup data into a location that differs from said storage location when a positive judgment result is obtained in the application judgment step,
the backup method further comprising
a process of dividing a provided file into a plurality of division files and storing the division files respectively into different data storage devices, and outputting information indicating a method of division and indicating data storage devices that became storage destinations of the respective division files as management information.

14. An automatic data backup method for making data be backed up automatically in a computer system having a function of making a desired application program be executed under management of an OS program, the backup method comprising:
an extension registration step for making one or a plurality of extensions, among file name extensions associated with application programs to be executed, be registered by the computer system based on an instruction of an operator;
an extension judgment step for making the computer system judge, when the computer system executes a storing process of storing specific data into a predetermined storage location, whether or not the specific data has a file name including an extension that has been registered in the extension registration step; and
a backup step for making the computer system redundantly store a copy of the specific data as backup data into a location that differs from said storage location when a positive judgment result is obtained in the extension judgment step, the backup method further comprising a process of dividing a provided file into a plurality of division files and storing the division files respectively into different data storage devices, and outputting information indicating a method of division and indicating data storage devices that became storage destinations of the respective division files as management information.

15. An automatic data backup method for making data be backed up automatically in a computer system having a function of making a desired application program be executed under management of an OS program, the backup method comprising:

an application registration step for making one or a plurality of application programs, among application programs to be executed, be registered by the computer system based on an instruction of an operator;

an extension registration step for making one or a plurality of extensions, among file name extensions associated with application programs to be executed, be registered by the computer system based on an instruction of an operator;

an application judgment step for making the computer system judge, when the computer system executes a storing process of storing specific data into a predetermined storage location, whether or not the storing process is based on an instruction of an application program that has been registered in the application registration step;

an extension judgment step for making the computer system judge, when the computer system executes a storing process of storing specific data into a predetermined storage location, whether or not the specific data has a file name including an extension that has been registered in the extension registration step; and a backup step for making the computer system redundantly store a copy of the specific data as backup data into a location that differs from said storage location when positive judgment results are obtained in both the application judgment step and the extension judgment step, the backup method further comprising a process of dividing a provided file into a plurality of division files and storing the division files respectively into different data storage devices, and outputting information indicating a method of division and indicating data storage devices that became storage destinations of the respective division files as management information.

* * * * *